United States Patent [19]
Nolle

[11] Patent Number: 5,854,521
[45] Date of Patent: Dec. 29, 1998

[54] MULTI-PHASE TRANSVERSE MAGNETIC FLUX MACHINE

[75] Inventor: Eugen Nolle, Sersheim, Germany

[73] Assignee: BLUM GmbH, Vaihingen, Germany

[21] Appl. No.: 638,506

[22] Filed: Apr. 26, 1996

[30] Foreign Application Priority Data

Apr. 27, 1995 [DE] Germany ......................... 195 15 543.2
Sep. 4, 1995 [DE] Germany ......................... 195 32 614.8

[51] Int. Cl.⁶ ................................................. H02K 21/00
[52] U.S. Cl. ........................... 310/12; 310/266; 310/154; 310/156; 310/181
[58] Field of Search ................................. 310/12, 13, 14, 310/266, 181, 112, 46, 154, 156; 318/135

[56] References Cited

U.S. PATENT DOCUMENTS

| | | | |
|---|---|---|---|
| 3,265,911 | 8/1966 | Madsen ...................................... | 310/12 |
| 4,563,602 | 1/1986 | Nagasaka .................................. | 310/12 |
| 4,594,520 | 6/1986 | Miwa et al. ............................... | 310/12 |
| 4,761,574 | 8/1988 | Nakagawa ................................. | 310/12 |
| 4,860,183 | 8/1989 | Maeda et al. ............................. | 318/135 |
| 5,051,641 | 9/1991 | Weh ......................................... | 310/163 |

FOREIGN PATENT DOCUMENTS

| | | | |
|---|---|---|---|
| 0352189 | 1/1990 | European Pat. Off. ....... | H02K 41/03 |
| 3543043 | 6/1986 | Germany .................................. | 310/12 |
| 41 25 779 | 12/1992 | Germany ....................... | H02K 41/03 |
| 63-87165 | 4/1988 | Japan ....................................... | 310/12 |
| 1-315250 | 12/1989 | Japan ....................................... | 310/12 |
| 714586 | 2/1980 | U.S.S.R. .................................. | 310/12 |
| 1494162 | 7/1989 | U.S.S.R. .................................. | 310/12 |
| 1585363 | 3/1981 | United Kingdom ......... | H02K 41/035 |

*Primary Examiner*—Stephen L. Stephan
*Assistant Examiner*—B. Mullins
*Attorney, Agent, or Firm*—Jacobson, Price, Holman & Stern, PLLC

[57] ABSTRACT

A multi-phase transverse flux machine includes a primary component having individual bundles of lamination elements which are spaced at a mutual separation distance in a direction defined as the longitudinal direction of the transverse flux machine. Each such bundle of lamination elements has leg members extending in a direction transverse to the longitudinal direction of the machine. The leg members are spaced at a mutual separation distance and are arranged in respective rows. The rows extend in the longitudinal direction. Each such row of leg members is excited by a respective exciting winding excited in such a way that the flux in the transverse direction at the various leg members reaches a maximum in a sequence. A secondary component includes rows of permanent magnet elements extending in the longitudinal direction of the machine. These rows of permanent magnet elements are disposed next to each other in the transverse direction of the machine, and each such row is associated with a row of leg members of the lamination element bundles. The permanent magnet elements are disposed at a distance from the free ends of the corresponding leg members. In each row of permanent magnet elements, the elements are arrayed in a sequence of alternating polarity. The permanent magnet elements of each longitudinal row of permanent magnet elements are displaced in the longitudinal direction, with respect to the permanent magnet element in the nearest neighboring rows of longitudinal row, such that when the exciting windings are excited, the secondary element is caused to move in the longitudinal direction of the machine.

27 Claims, 3 Drawing Sheets

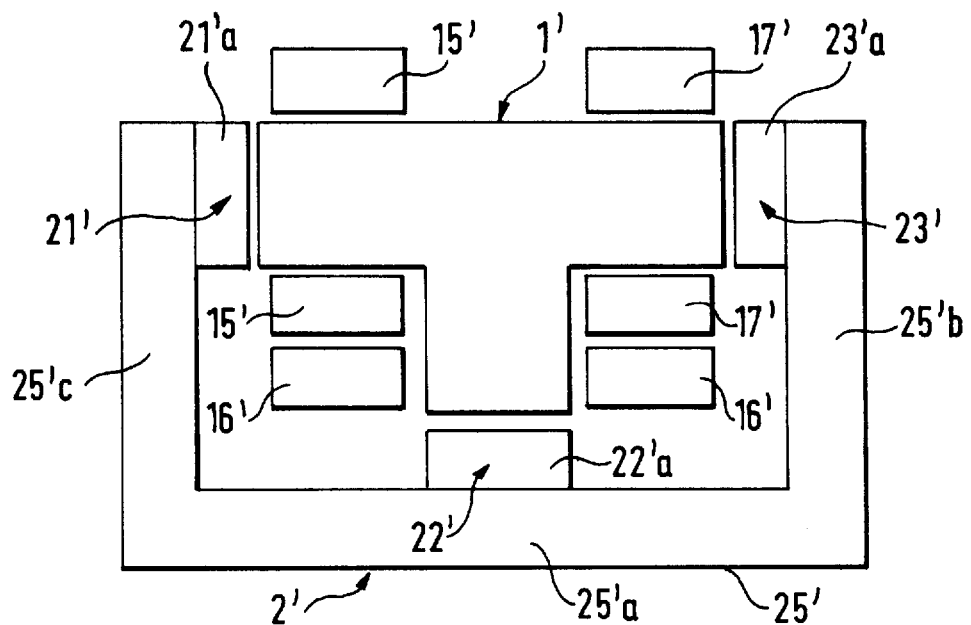
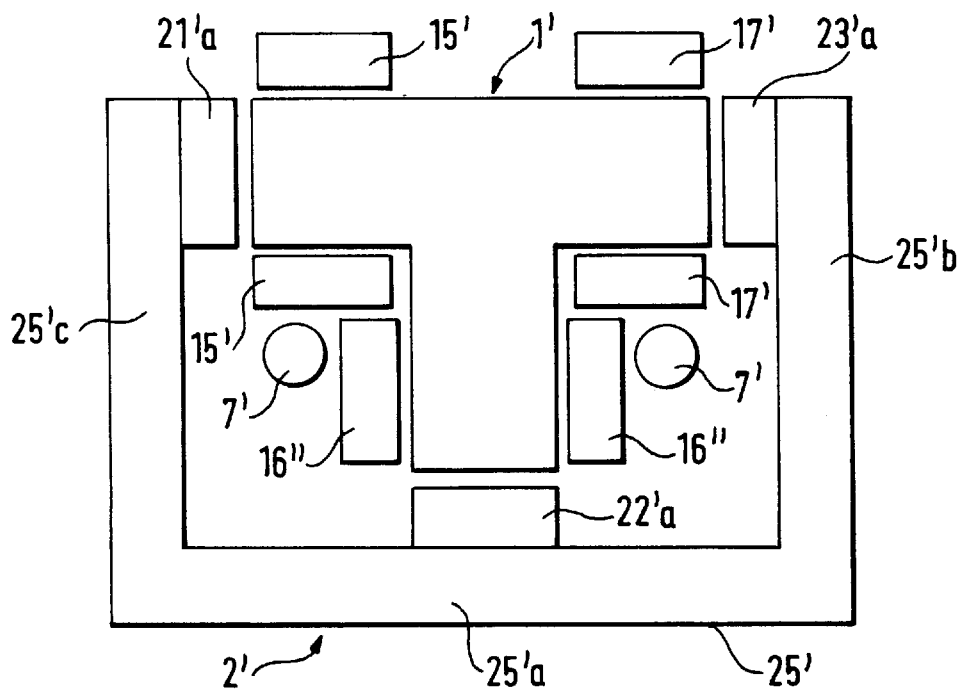

MULTI-PHASE TRANSVERSE MAGNETIC FLUX MACHINE

FIELD OF THE INVENTION

The invention relates to a multi-phase transverse magnetic flux machine.

BACKGROUND OF THE INVENTION

Ger. Pat. 4,125,779 discloses a transverse flux machine comprised of:
  a plurality of winding segments or winding strands in the stator, which segments are in the form of ring-shaped coils;
  at least one sequence of soft-iron elements in the stator which are spaced a uniform distance apart, extend transversely to the winding segments, and have groove-like recesses for accommodating the winding segments; and
  a rotor which does not bear any windings but is comprised of a plurality of partial rotors associated with the respective individual winding segments, which rotors have toothed regions, the teeth of which extend into the groove-like recesses of the soft-iron elements, wherewith the pitch of the toothed regions is the same as the spacing of the sequence of soft-iron elements.

In a preferred embodiment of this known machine, four winding segments are provided, wherewith all four winding segments extend through grooves in each soft-iron element. The groove-like recesses in the soft-iron elements extend parallel to the axis such that the two recesses in each pair of recesses are on opposite sides of the soft-iron elements and are at different distances from the machine axis. The soft-iron elements are disposed between two rotor discs, each of which bears two inner- and outer-toothed partial rotors.

Disadvantages of such a transverse flux machine are that its complicated structure is difficult to fabricate and therefore is relatively costly, despite a compact design which leads to high efficiency of utilization of materials. Therefore it has been impractical to exploit this known transverse flux machine industrially.

The underlying problem of the present invention is to provide improvements to transverse flux machines of the general type described supra, whereby direct, multi-phase operation is possible, wherewith the improved machine will be realizable in an embodiment which has a relatively simple construction and uses mass-produced components (although the components used may require some modification).

SUMMARY OF THE INVENTION

This problem is solved by a transverse flux machine of the type described initially supra. An essential advantage of the inventive transverse flux machine is its extremely simple construction, employing mass-produced components, e.g. transformer plates (although the components used may require some modification). Advantageously, the inventive transverse flux machines are relatively easy and inexpensive to manufacture, due to their simple construction. Advantageously embodiments of the inventive transverse flux machine are suitable as (or as components of) linear motors, stepping motors, positioning motors, and generators.

BRIEF DESCRIPTION OF THE DRAWINGS

The invention and certain of its refinements and embodiments are described in more detail hereinbelow, with reference to the accompanying drawings.

FIGS. 3 to 6 are alternative embodiments of the invention.

DETAILED DESCRIPTION OF THE PREFERRED EMBODIMENTS

Figure 1:
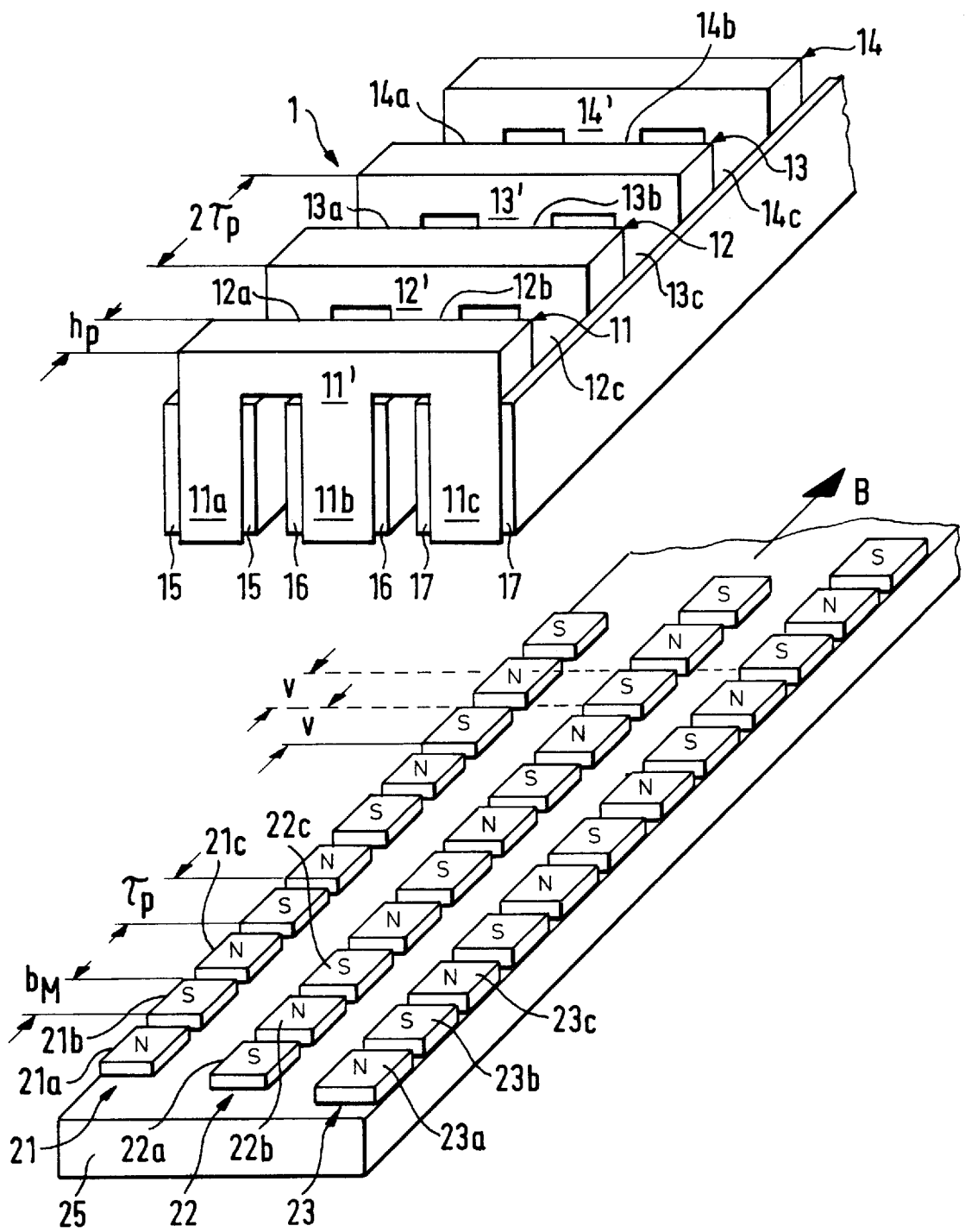
FIG. 1 is a schematic depiction of an inventive transverse flux machine wherein the secondary component moves translationally.

According to FIG. 1, illustrating a multi-phase arrangement for translational movement, the transverse flux machine is comprised essentially of a primary component 1 (preferably a stator) and a secondary component 2 (preferably translationally movable).

The primary component 1, for a three-phase embodiment of the transverse flux machine, is comprised essentially of individual bundles (11, 12, 13, 14, etc.) of lamination elements, each such bundle being comprised of a plurality of E-shaped lamination elements (11' ..., 12' ..., 13' ..., 14' ..., etc.) (generally comprised of metal or other magnetic material), which lamination elements are assembled in aligned fashion. The extent of each bundle (11, 12, 13, 14) in the longitudinal direction of component 1 is a predetermined distance $h_p$. The bundles (11, 12, 13, 14) are mounted in transverse alignment along the length of the component 1. The longitudinal distance between centers (or center lines, or the like) of two neighboring bundles is $2\tau_p$.

Each bundle (11, 12, 13, 14, etc.) of lamination elements has three legs (e.g.: 11a, 11b, 11c; 12a, 12b, 12c; 13a, 13b, 13c; 14a, 14b, 14c). The legs in the first set of legs (11a, 12a, 13a, 14a, ...) aligned in the longitudinal direction of component 1 have a common exciting winding 15. Similarly, the legs in the second such set (11b, 12b, 13b, 14b, ...) have a common exciting winding 16 (hereinafter, the "second common winding"), which is different from the winding 15 of the first set of legs; and the legs (11c, 12c, 13c, 14c, ...) in the third such set have yet another common winding (third common winding) 17. If the primary component 1 is quite long, a set of a certain number of successive legs may have a common exciting winding, and other sets of successive legs aligned longitudinally along component 1 with the set may have their own respective common exciting windings, wherewith a plurality of such respective common exciting windings is present in a single longitudinal row of legs.

In the secondary component 2, for each row (15, 16, 17) i.e. (a, b, c), of legs of the bundles of lamination elements in the primary component 1, a corresponding row (21, 22, 23) of permanent magnet elements is present. These permanent magnet elements in each row (21a, 21b, 21c, ...; 22a, 22b, 22c, ...; 23a, 23b, 23c, ...) are in a discrete array of elements of alternating polarity, spaced a distance apart. The transverse distances between the rows (21, 22, 23) in secondary component 2 correspond to the distances between the first, second, and third legs of the lamination element bundles (11, 12, 13, 14) of primary component 1, so that the permanent magnet elements (21a, 21b, 21c, ...) of the first row 21 are aligned with the free ends of the respective first legs (11a, 12a, 13a, 14a, ...); and likewise the elements (22a, 22b, 22c, ...) of the second row 22 are aligned with the free ends of the respective second legs (11b, 12b, 13b, 14b, ...); and the elements (23a, 23b, 23c, ...) of the third row 23 are aligned with the free ends of the respective third legs (11c, 12c, 13c, 14c, ...) with the longitudinal rows of permanent magnet elements being mutually displaced longitudinally so that only one row of permanent magnet elements is in longitudinal alignment with the respective legs of the lamination element bundles at a given time. The distances between all such permanent magnet elements in the rows (21, 22, 23) and the free ends of the respective legs corresponding to the magnet elements are equal.

In the exemplary embodiment of FIG. 1, the permanent magnet elements of rows (21, 22, 23) are disposed on a planar element 25 which is of a solid single unit construction or a laminated construction.

The length (dimension in the longitudinal direction of secondary component 2) of each permanent magnet element is designated $b_M$. The distance between centers (or center lines, or the like) of two neighboring permanent magnet elements in a given longitudinal row is $\tau_p$. The permanent magnet elements of a given row are displaced longitudinally with respect to the permanent magnet elements of the adjoining row by a distance equal to $$v=2\tau_p/3,$$

for a 3-phase system. For an m-phase system, the displacement distance is $$v=2\tau_p/m.$$

The following relation pertains:

$$h_p \leq b_M < \tau_p.$$

When the exciting windings (15, 16, 17) are excited by a symmetric 3-phase power signal (3-phase mains), the maximum flux in the transverse direction is reached (transverse to the longitudinal direction B of FIG. 1), in succession, in the first, second, and third rows of legs of the lamination element bundles (11a, 12a, 13a, 14a, . . . ; 11b, 12b, 13b, 14b, . . . ; 11c, 12c, 13c, 14c, . . . ), respectively. Thereby an impulse in the longitudinal direction (direction of movement B of the secondary component 2) is delivered to each of the corresponding permanent magnet elements opposite to the poles represented by the flux at the legs in question. The effect of the above-mentioned longitudinal displacement of the permanent magnet elements is that each flux maximum results in movement by one increment, whereby if the 3-phase power is applied continuously the secondary component 2 is translationally moved. For example, suppose that initially permanent magnet elements of polarity N (21a, 21c, 21e, . . . ) are disposed under the first legs (11a, 12a, 13a, 14a, . . . ) at the time the first legs are excited, and suppose that the polarity of that excitation is such that it causes component 2 to move in direction B. When subsequently the second legs (11b, 12b, 13b, 14b, . . . ) are excited, the permanent magnet elements of polarity N ( . . . , 22b, 22d, 22f, . . . ), which are displaced by the distance v with respect to the above-mentioned polarity N elements (21a, 21c, 21e, . . . ), will have been moved under the second legs. And when subsequently the third legs (11c, 12c, 13c, 14c, . . . ) are excited, the permanent magnet elements of polarity N ( . . . , 23a, 23c, 23e, . . . ), which are displaced by the distance v with respect to the above-mentioned N-polarity elements ( . . . , 22b, 22d, 22f, . . . ) of permanent magnet row 22, will have been moved under the third legs. When subsequently the first legs are excited again, the process is repeated, so that the secondary component 2 is moved continuously in direction B.

When an essentially symmetric 3-phase power signal is used (3-phase mains), the overall flux in the electrically excited component as well as in the permanent-magnetically excited component will be essentially zero, and as a result one will avoid undesirable return movement.

Figure 2:
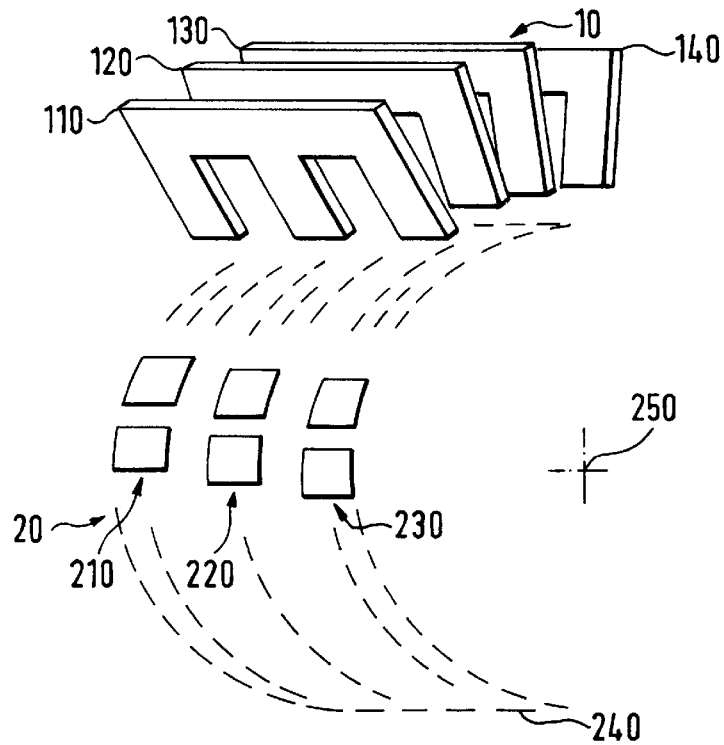
FIG. 2 is a schematic depiction of an inventive transverse flux machine wherein the secondary component moves rotationally.

With a transverse flux machine in accordance with the schematic depiction in FIG. 2, one can achieve rotational movement of the secondary component 20 around an axis 250. The permanent magnet elements are disposed in rows (210, 220, 230) on the circumference of a cylinder 240 which is rotatable around axis 250. The lamination element bundles (110, 120, 130, 140, . . . ) of the primary component 10 are correspondingly disposed along the circumference of the cylinder 240.

Figure 3:
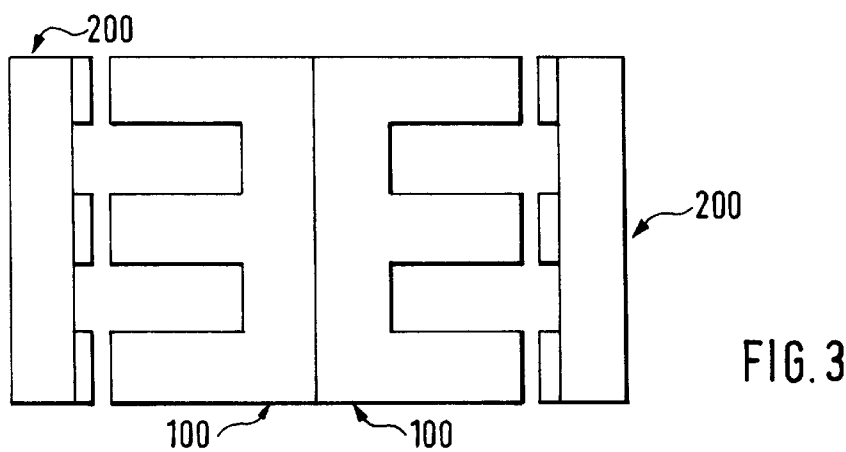

In the embodiments according to FIGS. 1 and 2, in addition to the desired motive forces in the desired direction of movement, attractive forces, generally undesirable, are produced between the primary component (1; 10) and the secondary component (2; 20). These attractive forces can be compensated for if, as shown in FIG. 3, two primary components (100, 100) and two secondary components (200, 200) are disposed mutually symmetrically such that the sides of the primary components (100, 100) which sides are oppositely disposed (on the given primary component) from the free leg ends are arranged in adjoining fashion. With this arrangement, the above-described attractive forces cancel each other.

Figure 4:
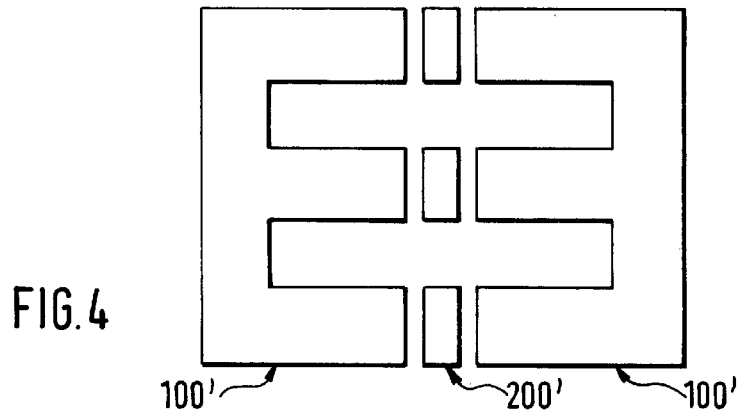

If two primary components (100', 100'), as shown in FIG. 4, which are excited with opposing-phase signals are disposed symmetrically such that the corresponding respective free leg ends are directed toward each other and the legs are in mutual alignment, and further if a secondary component 200' is disposed in the gap between the ends of the sets of legs, in the manner shown, on average (i.e. over the area of the plane of component 200') there will be no resultant attractive force between the primary components (100', 100') and the secondary component 200'. If the permanent magnet rows (201, 202, 203) of the secondary component 200' are suitably interconnected, one no longer has a plate-shaped component which creates a magnetic loopback, because with the described arrangement the corresponding magnetic fluxes originating from a leg element pass perpendicularly through the corresponding permanent magnet element and into the corresponding opposing leg element. It is particularly preferred, in the arrangement of FIG. 4, if the primary components (100', 100') are mutually displaced by a distance $\tau_p$ in the longitudinal direction (direction of extent of the rows of the secondary component 200'). In this way the rippling behavior of the overall system can be reduced, i.e. smoother movement can be achieved.

With the described transverse flux machine, for various applications it may be desired:
 to produce a motive force under conditions of high speed movement; or
 to produce a holding force under conditions of low speed movement or under stopped conditions (speed zero, e.g. when the machine is used as a positioning motor or stepping motor).

Thus the exciting frequency, and the frequency of the magnetic field (proportional thereto), may be quite high or may be zero. In the high frequency case, it is advantageous to employ high quality laminated transformer plates each comprised of a plurality of lamination elements; these plates are used in the exciting system and in the magnetic loopback components. In the zero-frequency case, at least the loopback components may be comprised of solid material of unitary construction, adding stability and reducing cost.

As an example, the described transverse flux machine may be used in connection with magnetic-suspension rail transit (magnetic levitation rail transit), wherein the exciting windings excite leg elements of primary components having lengths of, e.g. 50–100 m each. Under these circumstances it is advantageous if the primary component 1 forms a rail (fixed component).

FIGS. 5 and 6 illustrate particularly compact configurations which are refinements of the above-described inventive transverse flux machine. Here, the secondary component 2' is in the form of a piece 25', preferably of generally U-shaped cross section, which provides a magnetic loopback. Piece 25' has a generally planar base section 25'a and generally planar side sections (25'b, 25'c), which side sections are preferably disposed perpendicularly to the base section.

On the side of base section 25'a on which the space surrounded by the piece 25' is located there is disposed a row 22' of permanent magnets, which row extends perpendicularly to the plane of the drawing and corresponds to the row 22 in FIG. 1. Row 22' is preferably disposed centrally between the side sections (25'b, 25'c). The permanent magnet 22'a in row 22' is visible in FIGS. 5 and 6. Additional rows (21', 23') of permanent magnets, corresponding to rows 21 and 23 of FIG. 1, are disposed at mutually opposite positions on the mutually facing sides of the side sections (25'c, 25'b, respectively). The permanent magnet 21'a in row 21', and the permanent magnet 23'a in row 23', are visible in FIGS. 5 and 6. The same spacing and displacement relations between permanent magnets exist as described in connection with FIG. 1; in particular, the distances between the permanent magnets in the longitudinal direction, and the relative longitudinal displacements of the rows (21', 22', 23').

The lamination element bundles which are spaced along the longitudinal dimension of the primary component 1' of the transverse flux machine have a T-shaped cross section. A significant consideration in this choice of shape is that the individual lamination elements of which the laminated bundles are comprised can be stamped from sheets of material without wastage.

Respective exciting windings (15', 16', 17') are disposed on the end regions of the respective legs of the T-shaped lamination element bundles 1', as illustrated in FIGS. 5 and 6. These windings cooperate with the respective rows (21', 22', 23') of permanent magnet elements, and are excited in the manner described in connection with FIG. 1.

It is advantageous in the embodiments of FIGS. 5 and 6 that the forces exerted by the permanent magnet elements of the rows 21' and 23', which urge the primary component 1' in the direction toward the respective rows 21' and 23', are essentially compensated, so that no net lateral force is exerted on primary component 1'.

In the embodiments of FIGS. 5 and 6, the two lateral exciting windings 15' and 17' are configured differently than the central winding (16', 16"). In the arrangement according to FIG. 5, the width of winding 16' parallel to the winding axis is less in comparison to its thickness (horizontal dimension in FIG. 5), than is the case with windings 15' and 17'. The arrangement according to FIG. 6 is particularly advantageous because winding 16" has a relatively greater width parallel to the winding axis, wherewith all of the exciting windings (15', 16', 17') can have the same form. This reduces manufacturing costs for the embodiment of FIG. 6; only one winding arrangement (jig, etc.) is needed for the windings.

Since the winding thicknesses of the exciting windings (15', 16", 17') are generally equal, in the embodiment according to FIG. 6, a space is available in the region around and outside of the windings 16" and 15' (in the direction away from the lamination element bundles), and in the region around and outside of the windings 16" and 17', namely between the sides of the windings. This space is suitable for accommodating a cooling conduit 7' extending in the longitudinal direction of the transverse flux machine.

The invention is usable for short stator designs or long stator designs. In a short stator design the winding-bearing length is shorter than the permanent-magnet-bearing length, wherewith the primary component may be shorter than the secondary component; in a long stator design the winding-bearing length is longer than the permanent-magnet-bearing length. In a magnetic-suspension rail system, preferably a long stator design is used, wherein the rail comprises the winding-bearing component and the vehicle comprises the permanent-magnet-bearing component. In the classical applications of linear motors, short stator designs were preferred. According to the invention, a long stator design is preferred, with a long stator and a short, moving permanent-magnet-bearing component. The advantages of this are that the moving component does not need to accommodate energy supply means (power lines) and cooling means (cooling conduit).

I claim:

1. A multi-phase transverse flux machine having two primary components and a secondary component associated with each primary component and in which said primary components include individual bundles of lamination elements which are spaced at a mutual separation distance along a longitudinal direction of the transverse flux machine, each said bundle of lamination elements having leg members, each of said leg members extending in a direction transverse to the longitudinal direction of the machine, said leg members being spaced at a mutual separation distance and being arranged in respective rows, said rows extending in said longitudinal direction, and sides of the primary components, oppositely disposed from free leg ends being arranged in adjoining fashion, a respective exciting winding serving to excite each said row of leg members, said exciting windings being excited so that the flux in the transverse direction at the various leg members reaches a maximum in a sequence, said secondary components including rows of permanent magnet elements, said rows each extending in the longitudinal direction of the machine, said rows of permanent magnet elements being disposed next to each other in the transverse direction of the machine, wherein the improvement comprises each said row being associated with a row of leg members of the lamination element bundles, in each said row of permanent magnet elements said permanent magnet elements being arrayed in a sequence of alternating polarity, and each said longitudinal row of permanent magnet elements being displaced in the longitudinal direction of the machine with respect to a nearest neighboring row so that when the exciting windings are excited, said secondary element is caused to move in the longitudinal direction of the machine.

2. A transverse flux machine according to claim 1, wherein said permanent magnet elements are displaced longitudinally with respect to said permanent magnet elements of said nearest-neighbor row by a distance (v) equal to $$v = 2\,\tau_p/m,$$

where $2\tau_p$ is the distance between centers of two successive, in the longitudinal direction of the machine, lamination element bundles of said primary component, and m is the number of leg members of a lamination element bundle in the transverse direction of the machine.

3. A transverse flux machine according to claim 1, wherein each lamination element bundle of said primary component has three leg members.

4. A transverse flux machine according to claim 3, wherein said exciting windings are supplied with power by a symmetric 3-phase power signal.

5. A transverse flux machine according to claim 1, wherein said permanent magnet elements in the rows of permanent magnet elements are disposed on a planar structure which creates a magnetic loopback.

6. A transverse flux machine according to claim 5, wherein the planar part is one of solid unitary construction and laminated construction.

7. A transverse flux machine according to claim 1, wherein the bundles of lamination elements are mounted in transverse alignment and at mutual separations and the rows of permanent magnet elements are linear rows.

8. A transverse flux machine according to claim 1, wherein the rows of permanent magnet elements are disposed on the surface of a circular cylinder rotatable around an axis and the bundles of lamination elements are uniformly distributed along the circumference of the cylinder.

9. A transverse flux machine according to claim 1, wherein two primary components excited with opposing-phase signals are disposed such that corresponding respective free leg ends are directed toward each other and are spaced with a gap therebetween and a secondary component is disposed in the gap between the free ends of the leg members of the two primary components.

10. A transverse flux machine according to claim 9, wherein the primary components are mutually displaced in the longitudinal direction of the machine by a distance $\tau_p$.

11. A transverse flux machine according to claim 1, wherein the exciting windings are distributed along the longitudinal direction of the machine so that each winding excites a specific number of successive leg members arrayed in spatial succession in progression along said longitudinal direction.

12. A transverse flux machine according to claim 1, wherein $h_p \leq b_M < \tau_p$, where $h_p$ is the length dimension of a lamination element bundle in the longitudinal direction of the machine, $b_M$ is the length dimension of a permanent magnet element in the longitudinal direction of the machine, and $\tau_p$ is the distance between centers of two neighboring permanent magnet elements in the longitudinal direction of the machine in a row of magnet elements.

13. A multi-phase transverse flux machine comprising:

a primary component and a secondary component, said primary component including individual bundles of lamination elements which are spaced at a mutual separation distance along a longitudinal direction of the machine, each said bundle of lamination elements having leg members, each of said leg members extending in a direction transverse to the longitudinal direction of the machine, said leg members being spaced at a mutual separation distance and being arranged in respective rows, said rows extending in said longitudinal direction, a respective exciting winding serving to excite each said row of leg members, said exciting windings being excited so that the flux in the transverse direction at the various leg members reaches a maximum in a sequence, said secondary component including rows of permanent magnet elements, said rows each extending in the longitudinal direction of the machine, said rows of permanent magnet elements being disposed next to each other in the transverse direction of the machine, and each said row being associated with a row of leg members of the lamination element bundles, said permanent magnet elements being disposed at a distance from the free ends of the corresponding leg members, in each said row of permanent magnet elements said permanent magnet elements being arrayed in a sequence of alternating polarity, each said longitudinal row of permanent magnet elements being displaced in the longitudinal direction of the machine with respect to a nearest neighboring row so that when the exciting windings are excited, said secondary element is caused to move in the longitudinal direction of the machine, and two primary components disposed such that sides of the primary components, oppositely disposed from the free leg ends, being arranged in adjoining fashion and a secondary component being associated with each primary component.

14. A multi-phase transverse flux machine comprising:

a primary component and a secondary component, said primary component including individual bundles of lamination elements which are spaced at a mutual separation distance along a longitudinal direction of the machine, each said bundle of lamination elements having leg members, each of said leg members extending in a direction transverse to the longitudinal direction of the machine, said leg members being spaced at a mutual separation distance and being arranged in respective rows, said rows extending in said longitudinal direction, a respective exciting winding serving to excite each said row of leg members, said exciting windings being excited so that the flux in the transverse direction at the various leg members reaches a maximum in a sequence, said secondary component including rows of permanent magnet elements, said rows each extending in the longitudinal direction of the machine, said rows of permanent magnet elements being disposed next to each other in the transverse direction of the machine, and each said row being associated with a row of leg members of the lamination element bundles, said permanent magnet elements being disposed at a distance from the free ends of the corresponding leg members, in each said row of permanent magnet elements said permanent magnet elements being arrayed in a sequence of alternating polarity, each said longitudinal row of permanent magnet elements being displaced in the longitudinal direction of the machine with respect to a nearest neighboring row so that when the exciting windings are excited, said secondary element is caused to move in the longitudinal direction of the machine, and each of the lamination element bundles in the primary component having a T-shaped cross section, and a respective exciting winding being disposed on an end region of each of the three legs of the T-shaped cross-section and three respective rows of permanent magnet elements being disposed on the secondary component, wherewith each row of permanent magnet elements faces the leg-end region of one of the rows of leg members of the lamination element bundles on the primary component.

15. A transverse flux machine according to claim 14, wherein the secondary component has a generally planar base section and generally planar side sections, said side sections are disposed at respective angles to said base section of approximately 90°, so that the secondary component has a generally U-shaped cross section, and a row of permanent magnet elements is disposed on the side surface of the base section, said side surface facing the space surrounded by the secondary component, and two respective rows of permanent magnet elements are disposed on opposite locations of the side faces of the side sections, said side surfaces facing said space surrounded by the secondary component.

16. A transverse flux machine according to claim 15, wherein the row of permanent magnet elements is disposed midway between the side sections.

17. A transverse flux machine according to claim 14, wherein the exciting windings of the end regions of the first and second leg members of the T-shaped cross section have winding widths in a direction parallel to said first and second leg members, said winding widths are greater than the thicknesses of said windings in a direction perpendicular to said first and second leg members, and the exciting windings of the third leg members have a winding thickness in the direction perpendicular to the third leg members which is greater than the winding width of said windings in the direction parallel to said third leg members.

18. A transverse flux machine according to claim 17, wherein the exciting windings of the end regions of the first, second, and third leg members of the T-shaped cross section are of identical construction and dimensions.

19. A transverse flux machine according to claim 18, wherein cooling conduits for cooling the transverse flux machine extend in the longitudinal direction of the transverse flux machine and are disposed in a region near the sides of the exciting windings of the first and third leg members, and of the second and third leg members, respectively of the T-shaped cross section.

20. A transverse flux machine according to claim 14, wherein the exciting windings of the end regions of the first and second leg members of the T-shaped cross section have winding widths in a direction parallel to said first and second leg members, said winding widths are greater than the thicknesses of said windings in a direction perpendicular to said first and second leg members, and the exciting windings of the third leg members have a winding thickness in the direction perpendicular to the third leg members which is less than the winding width of said windings in the direction parallel to said third leg members.

21. A multi-phase transverse flux machine having a primary component and a secondary component and in which said primary component includes individual bundles of lamination elements which are spaced at a mutual separation distance along a longitudinal direction of the transverse flux machine, each said bundle of lamination elements having leg members, each of said leg members extending in a direction transverse to the longitudinal direction of the machine, said leg members being spaced at a mutual separation distance and being arranged in respective rows, said rows extending in said longitudinal direction, a respective exciting winding serving to excite each said row of leg members, said exciting windings being excited so that the flux in the transverse direction at the various leg members reaches a maximum in a sequence, said secondary component including rows of permanent magnet elements, said rows each extending in the longitudinal direction of the machine, said rows of permanent magnet elements being disposed next to each other in the transverse direction of the machine, wherein the improvement comprises each said row being associated with a row of leg members of the lamination element bundles, in each said row of permanent magnet elements said permanent magnet elements being arrayed in a sequence of alternating polarity, each said longitudinal row of permanent magnet elements being displaced in the longitudinal direction of the machine with respect to a nearest neighboring row so that when the exciting windings are excited, said secondary element is caused to move in the longitudinal direction of the machine, and each of the lamination element bundles in the primary component having a T-shaped cross section, and a respective exciting winding being disposed on an end region of each of the three legs of the T-shaped cross-section and three respective rows of permanent magnet elements being disposed on the secondary component, wherewith each row of permanent magnet elements faces the leg-end region of one of the rows of leg members of the lamination element bundles on the primary component.

22. A transverse flux machine according to claim 21, wherein the secondary component has a generally planar base section and generally planar side sections, said side sections are disposed at respective angles to said base section of approximately 90°, so that the secondary component has a generally U-shaped cross section, and a row of permanent magnet elements is disposed on the side surface of the base section, said side surface facing the space surrounded by the secondary component, and two respective rows of permanent magnet elements are disposed on opposite locations of the side faces of the side sections, said side surfaces facing said space surrounded by the secondary component.

23. A transverse flux machine according to claim 22, wherein the row of permanent magnet elements is disposed midway between the side sections.

24. A transverse flux machine according to claim 21, wherein the exciting windings of the end regions of the first and second leg members of the T-shaped cross section have winding widths in a direction parallel to said first and second leg members, said winding widths are greater than the thicknesses of said windings in a direction perpendicular to said first and second leg members, and the exciting windings of the third leg members have a winding thickness in the direction perpendicular to the third leg members which is greater than the winding width of said windings in the direction parallel to said third leg members.

25. A transverse flux machine according to claim 23, wherein the exciting windings of the end regions of the first, second, and third leg members of the T-shaped cross section are of identical construction and dimensions.

26. A transverse flux machine according to claim 25, wherein cooling conduits for cooling the transverse flux machine extend in the longitudinal direction of the transverse flux machine and are disposed in a region near the sides of the exciting windings of the first and third leg members, and of the second and third leg members, respectively of the T-shaped cross section.

27. A transverse flux machine according to claim 21, wherein the exciting windings of the end regions of the first and second leg members of the T-shaped cross section have winding widths in a direction parallel to said first and second leg members, said winding widths are greater than the thicknesses of said windings in a direction perpendicular to said first and second leg members, and the exciting windings of the third leg members have a winding thickness in the direction perpendicular to the third leg members which is less than the winding width of said windings in the direction parallel to said third leg members.

* * * * *